US012773888B2

(12) United States Patent
Pfander et al.

(10) Patent No.: US 12,773,888 B2
(45) Date of Patent: Oct. 27, 2026

(54) HOUSING FOR MULTI-FLOWPATH HVAC SYSTEM

(71) Applicant: MAHLE INTERNATIONAL GMBH, Stuttgart (DE)

(72) Inventors: Andreas Pfander, Weinstadt (DE); Rahul Kulkarni, Stuttgart (DE); Michael Primerano, Lockport, NY (US); Vincenzo Antonio Venezia, Magstadt (DE); Andre Bauer, Wendlingen (DE)

(73) Assignee: MAHLE International GmbH, Stuttgart (DE)

(*) Notice: Subject to any disclaimer, the term of this patent is extended or adjusted under 35 U.S.C. 154(b) by 104 days.

(21) Appl. No.: 18/825,582

(22) Filed: Sep. 5, 2024

(65) Prior Publication Data

US 2025/0178399 A1 Jun. 5, 2025

Related U.S. Application Data

(60) Provisional application No. 63/604,623, filed on Nov. 30, 2023.

(51) Int. Cl.
*B60H 1/00* (2006.01)

(52) U.S. Cl.
CPC .................... *B60H 1/00064* (2013.01); *B60H 2001/00092* (2013.01); *B60H 2001/00128* (2013.01)

(58) Field of Classification Search
CPC .............. B60H 1/0005; B60H 1/00064; B60H 2001/00135; B60H 2001/00092; B60H 2001/00192
See application file for complete search history.

(56) References Cited

U.S. PATENT DOCUMENTS

2013/0137355 A1* 5/2013 Patti .................. B60H 1/00792 454/139

FOREIGN PATENT DOCUMENTS

| | | | | |
|---|---|---|---|---|
| DE | 19750381 A1 | 5/1998 | | |
| DE | 10202969 A1 | 9/2002 | | |
| DE | 102008030063 A1 | 1/2009 | | |
| KR | 20110089579 A * | 8/2011 | ......... | B60H 1/00035 |

(Continued)

OTHER PUBLICATIONS

German Search Report, dated Apr. 8, 2025, Application No. DE 10 2024 134 829.1, 6 pages.

*Primary Examiner* — Eric S Ruppert
(74) *Attorney, Agent, or Firm* — Barnes & Thornburg

(57) ABSTRACT

An assembly for air movement within a vehicle. The assembly includes a housing, a fan proximate to the air inlet, an evaporator disposed such that air leaving the fan flows through the evaporator, and a heater, a mixing chamber that is downstream of the evaporator and the heater, the housing establishes a plurality of internal air flow plenums downstream of the evaporator, including first air flow plenum that extends through and past the heater and into the mixing chamber, and a second air flow plenum that bypasses the heater and flows into the mixing chamber. A mixing chamber receives air from the first and second air flow plenums. A plurality of distribution plenums extend from the mixing chamber, each includes a flow valve proximate to an exit, wherein the flow valves are configured to allow or substantially prevent air flow to exit the respective distribution plenum.

15 Claims, 6 Drawing Sheets

(56) References Cited

FOREIGN PATENT DOCUMENTS

| | | | | | |
|---|---|---|---|---|---|
| KR | 20180088139 | A | * | 8/2018 | ......... B60H 1/00864 |
| WO | WO2023/021197 | | | 2/2023 | |

* cited by examiner

HOUSING FOR MULTI-FLOWPATH HVAC SYSTEM

CROSS-REFERENCE TO RELATED APPLICATIONS

This application claims priority from U.S. Provisional Application No. 63/604,623 filed on Nov. 30, 2023, the entirety of which is hereby incorporated by reference herein.

BACKGROUND OF THE INVENTION

This application relates to HVAC system that are used to condition air within a passenger compartment of a vehicle.

SUMMARY OF THE INVENTION

A first representative embodiment of the disclosure is provided. The embodiment includes an assembly for air movement within a vehicle. The assembly includes a housing, the housing establishes an air inlet and one or more air outlets, the housing includes a fan disposed proximate to the air inlet wherein operation of the fan urges air to flow into the air inlet, the housing further comprises an evaporator disposed such that air leaving the discharge of the fan flows through the evaporator, and a heater, the housing further comprises a mixing chamber that is downstream of the evaporator and the heater. The housing defines a plurality of internal air flow plenums downstream of the evaporator, comprising a first air flow plenum that extends through and past the heater and into the mixing chamber, and a second air flow plenum that bypasses the heater and flows into the mixing chamber. The housing further comprises a mixing chamber that receives air from the first and second air flow plenums, wherein air from the first and second flow plenums interacts therein. The housing further comprises a plurality of distribution plenums that extend from the mixing chamber, wherein each of the plurality of distribution plenums includes a flow valve therein and proximate to an exit of the respective distribution chamber, wherein the flow valve for each of the plurality of distribution chambers is configured to allow or substantially prevent air flow to exit the respective distribution plenum.

Other representative embodiments of the disclosure are provided, which include the above representative embodiment of the disclose and also include one more of the Numbered Paragraphs that are provided at the end of this specification.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE INVENTION

Figure 1:
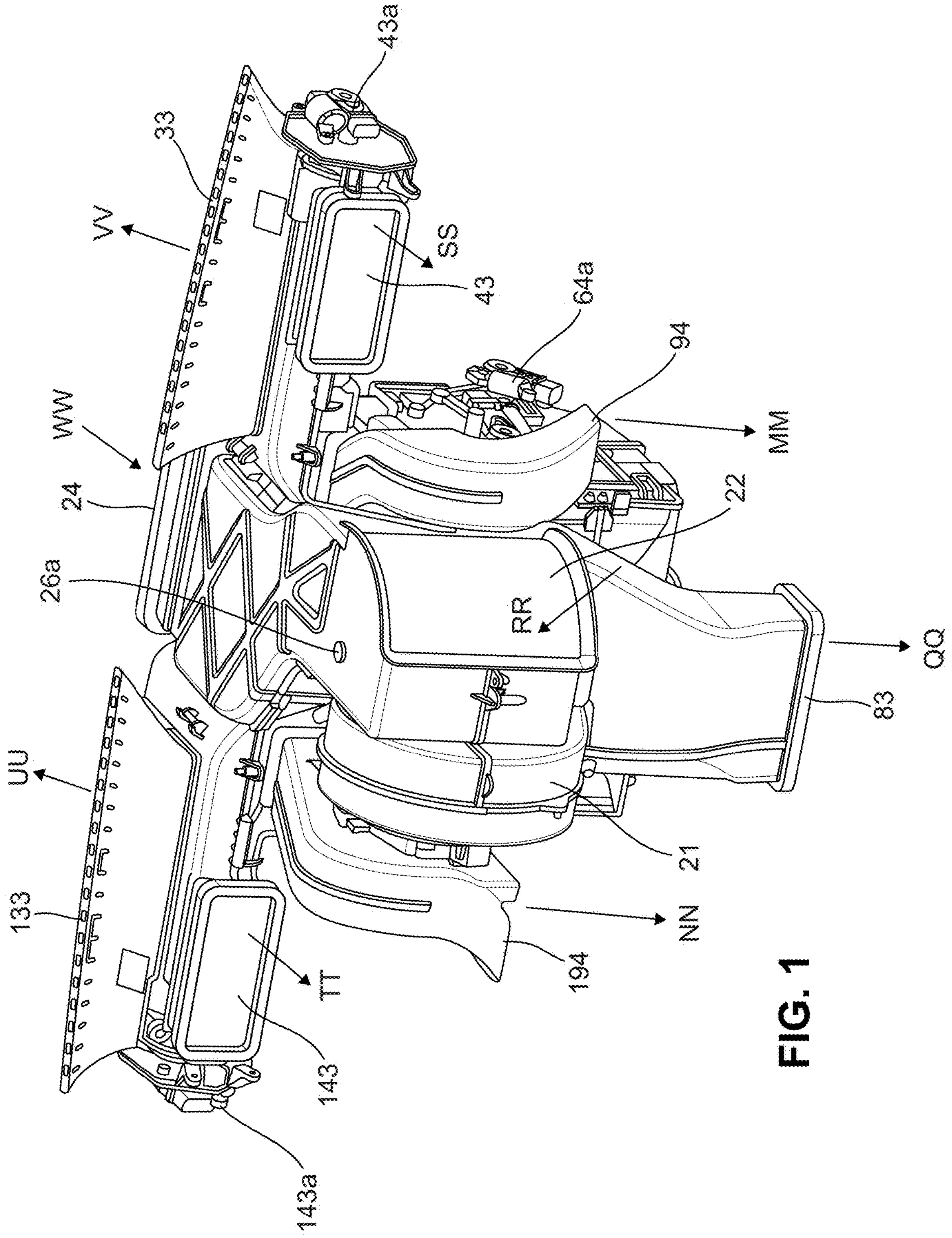
FIG. 1 is a passenger's seat (for vehicle that is driven on the right side of the road with the driver in the left front seat) perspective of a housing for an HVAC system with multiple flow paths.
Figure 2:
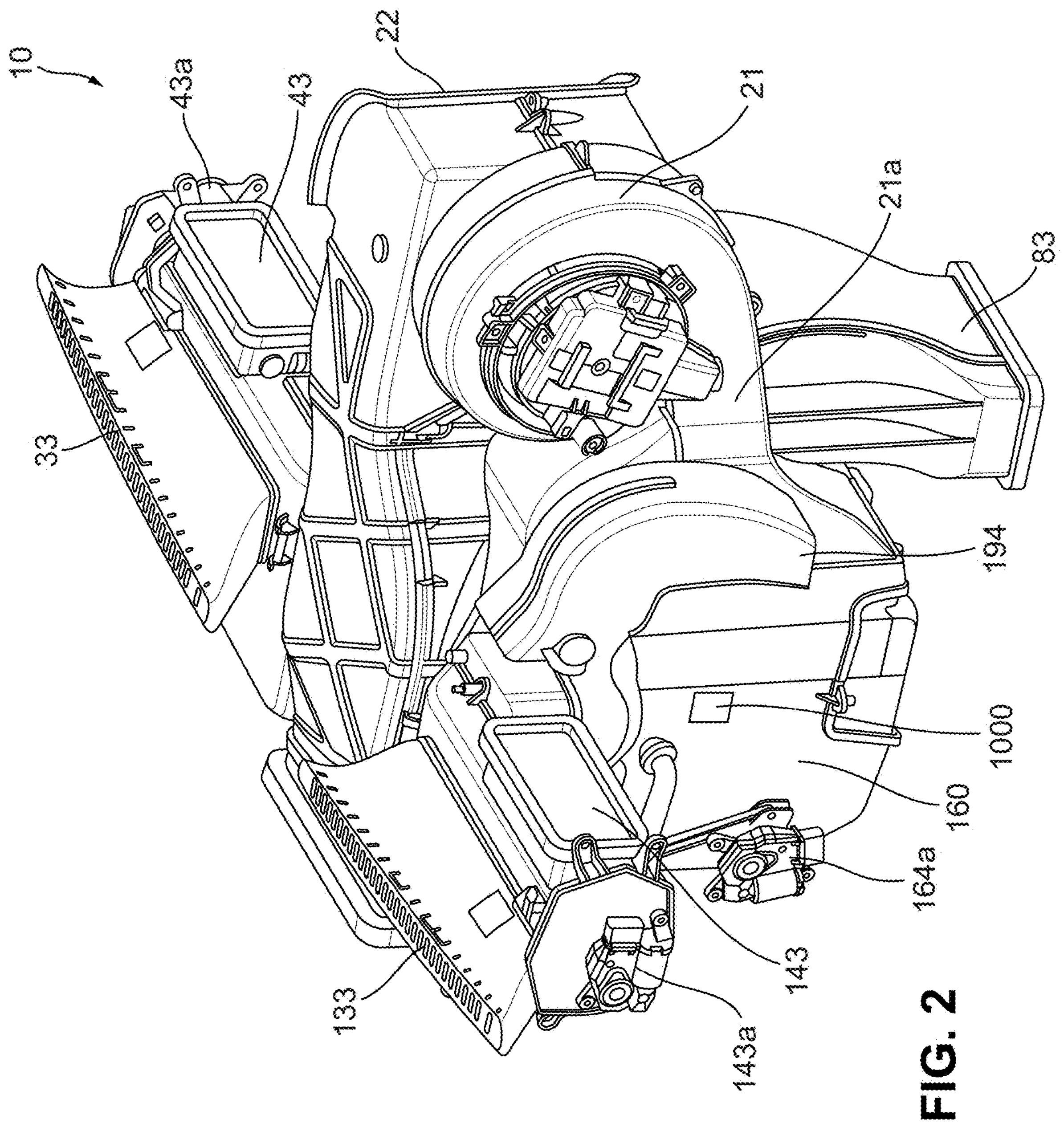
FIG. 2 is a driver's seat perspective view of the housing of FIG. 1.
Figure 3:
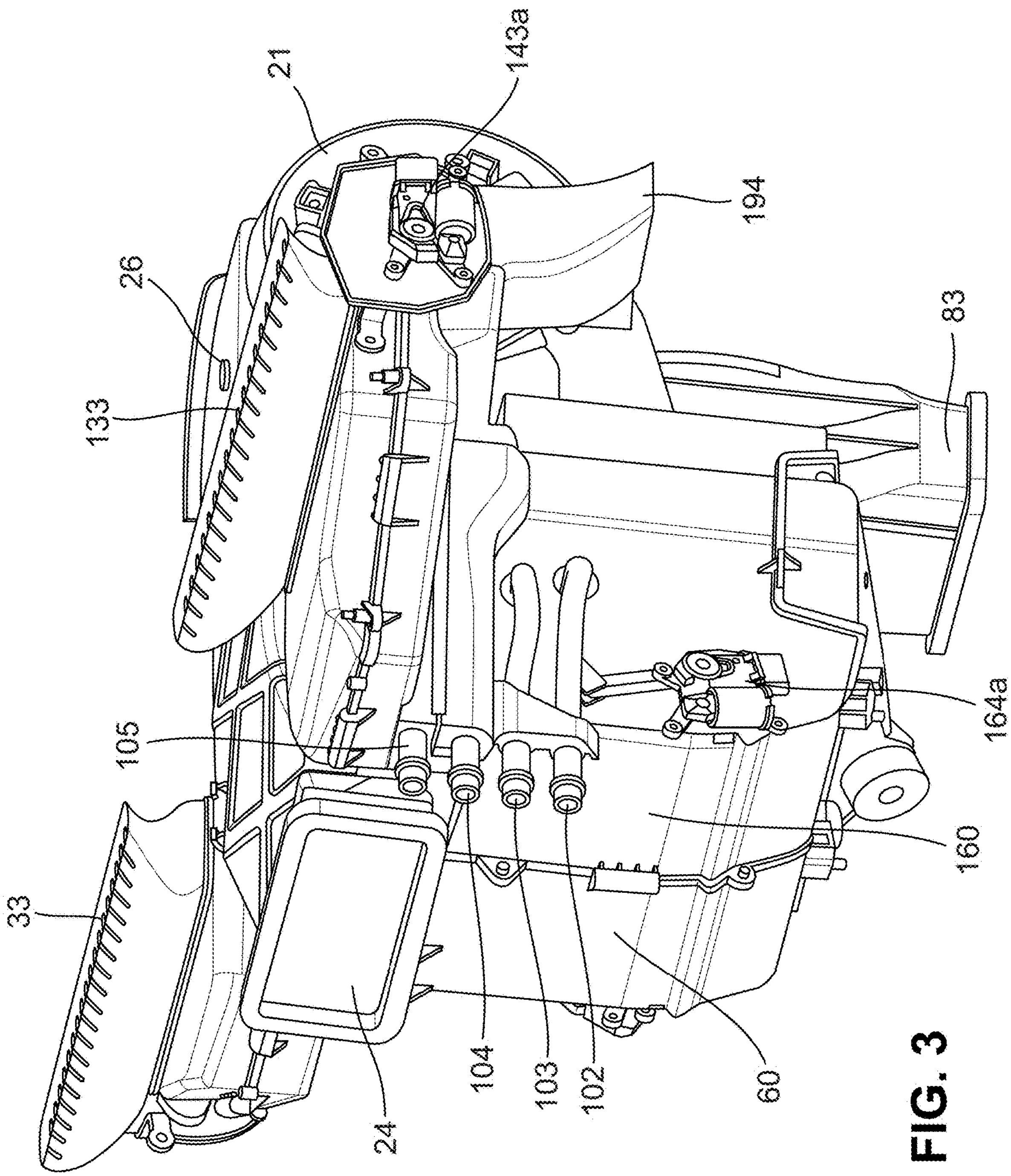
FIG. 3 is another perspective view of the housing of FIG. 1 from a position at a front left portion of a vehicle that receives the housing (with the vehicle that receives the housing not shown).
Figure 4:
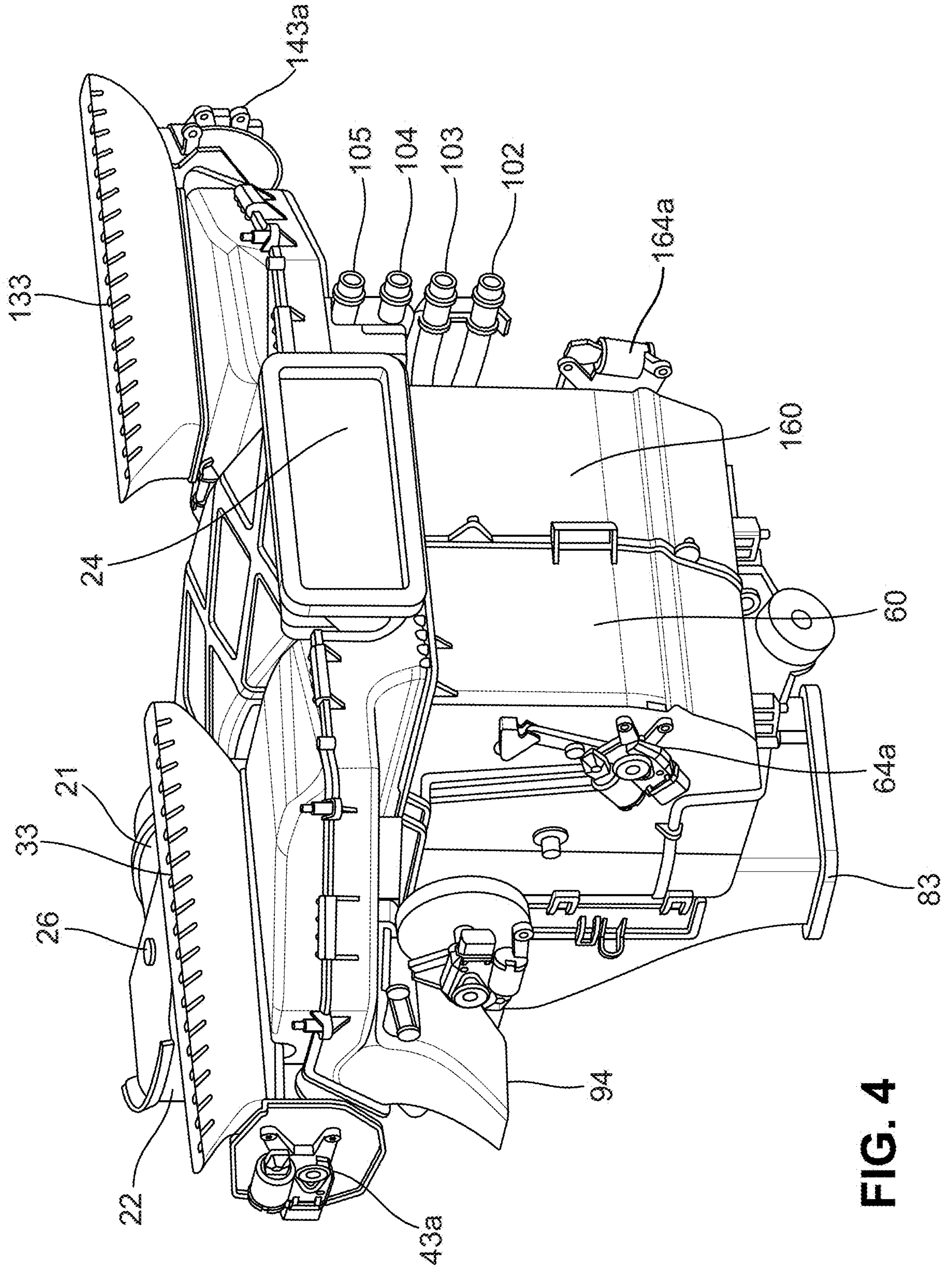
FIG. 4 is another perspective view of the housing of FIG. 1 from a position at a front left portion of a vehicle that receives the housing (with the vehicle that receives the housing not shown).

Turning now to FIGS. 1-6, an assembly 10 for air movement and air treatment within a vehicle is provided. The assembly 10 is described herein as configured for use in a passenger vehicle, such as a sedan, SUV, cross-over, minivan, truck, or the like, although the assembly is equally applicable for other vehicle types that are configured to receive more than one passenger within a passenger compartment. The passenger compartment of the vehicle that receives the assembly 10 may be one that is configured with a seat or position for a driver on side of a first row of the vehicle with a passenger seat or position on an opposite side of the first row of the vehicle. The vehicle may additionally include a second row for two or more passengers to sit therein, which is provided directly behind the first row. In some vehicles, such as SUVs, the vehicle may additionally include a third row for two or more additional passengers to sit therein. Other vehicles that could receive the assembly may be vans with more than two rows of seats for passengers behind the first row. The term "row" is used herein to include two or more individual seats that are aligned with each other and to also include a bench where two or more passengers may sit upon. The vehicle may be powered from an internal combustion engine, or an electric vehicle, or a hybrid vehicle that includes an internal combustion engine, but may also be operated based upon power stored in a battery.

The assembly 10 is configured to provide conditioned air flow to several locations within a vehicle, with several of the locations configured to receive air simultaneously at different temperatures. For example, in one embodiment, the assembly 10 is provided to provide air at a desired temperature and flow rate to dashboard vents on a driver side of a vehicle, to provide air at a desired temperature and flow rate (which may be different from the desired temperature and flow rate of the driver side of the vehicle) and provide air to vents within a second row of a vehicle which may be different desired temperature than the driver side and passenger's side vents. The assembly 10 may also be configured to provide heated air to be used for defrost operations. The figures used herein identify the driver side of the vehicle for use with vehicles where the driver sits in the left side of the vehicle (typically for jurisdictions where vehicles travel on the right side of the road), and the front row passenger sits in the right side of the vehicle. The assembly 10 is constructed such that it can be used in vehicles where the driver side is the right side of the vehicle (i.e. typically for vehicles where vehicles travel on the left side of the road) and the identification of driver side (as the left side) is only for simplicity—i.e. the assembly is equally appropriate for vehicles where the driver side is on the right side of the vehicle.

The assembly 10 includes a housing 20 that supports and encloses all of the components of the assembly as discussed herein, and establishes the plurality of air flow paths within the assembly that allow different air flows within the assembly. The housing 20 provides enclosure and mechanical support for the components that operate within the housing, such as the evaporator, the heater, and the plurality of doors within the control air flow within the various plenums discussed herein as desired. The housing 20 may also receive one or more air filters therewith to remove impurities within the air.

The housing 20 includes two air inlets, a first inlet 22 which draws suction from air that is within the passenger compartment of the vehicle (not shown). The first air inlet 22 leads within the housing to the suction of a fan 21 that when rotating produces a suction at its inlet and discharges air at high pressure and high speed therefrom. The housing 20 may include a second air inlet 24 that takes suction from air that is not within the passenger compartment of the vehicle that receives the assembly 10. For example, the second air inlet may take suction from air from the engine compartment to allow the outside air to enter into the housing. In embodiments where the housing 20 is provided with an electric vehicle (that does not include an internal combustion engine) the second inlet receives air from outside the vehicle through a flow path connected to draw air from outside of the vehicle. The housing 20 includes a door 26 that can be positioned to selectively allow the fan suction to pull from the first air inlet 22 (air flow RR), from second air inlet 24 (air flow WW) or to pull from both the first and second air inlets 22, 24. FIG. 1 depicts a pin 26*a* that is manipulated by an operator (not shown, but similar to operators 43*a*, 143*a* (below) that causes the door 26 to rotates upon the housing to change positions to change air flows within the housing. The door 26 may be operated by a controller 1000 (schematic) that is described elsewhere herein and is configured to operate the door 26 to result in the desired air flow entering the suction of the fan 21 and being pushed by the fan throughout the housing 20.

The housing 20 includes multiple air outlets, including a defrost 33, 133, passenger and driver side vents 43, 143, passenger and driver side floor outlets (not shown, but leading from third and fourth distribution plenums 94/194, below, and an outlet 83 that connects to a vehicle conduit (not shown) that leads to second or third row vents (not shown). As described herein the housing includes a passenger side portion 60 and a driver side portion 160 that are independent from each other. The passenger side portion 60 directs air to the passenger side defrost, the passenger side vent 43 and the passenger side floor outlet (via 94). The driver side portion 160 directs air to the driver side defrost 133, the driver side vents 143, and the driver side floor outlets (via 194). As discussed herein, the driver side depicted in the figures is the left side of the vehicle (i.e. for a vehicle that is configured to be driven on the right side of the road). In other embodiments, the assembly may be used vehicles where the actual driver side is on the right side of the vehicle (i.e. a vehicle that is configured to be driven on the left side of the road). The use of “driver side” and “passenger side” herein is simply used as an identifier of a specific side of the assembly and not limiting to the type of vehicle that receives the assembly therein, i.e. the assembly 10 is equally applicable for vehicles where the driver is on the left side of the vehicle and the right side of the vehicle.

The housing 20 includes an evaporator 120 and a heater 130 that are disposed inside and within the air flow as discussed herein. The evaporator 120 may be a portion of a refrigeration system disposed within the vehicle, with the compressor, expansion valve, and condenser disposed in the mechanical compartment (or for vehicles that are do not include internal combustion engines within a different portion of the vehicle than the housing 20. Elements 102 and 103 depict supply and return lines for refrigerant that flows through evaporator 120. In alternate embodiments, the evaporator may be replaced with another device that can remove heat from that flows therepast, such as a system that provides Peltier effect (or thermoelectric cooling), or may be a heat exchanger through which chill water flows into and out of the heat exchanger via pipes 102, 103. For the sake of brevity the evaporator 120 as referenced herein includes within its scope an evaporator 120 from a refrigeration system or any other item that can remove heat from air that flows therepast, such as a chiller or a chill water system, or a Peltier effect element or the like-unless the disclosure herein specifically references one type of cooling structure.

The housing 20 further includes a heater 130 that is disposed downstream of evaporator 120, with the specific air flows discussed herein. The heater 130 may be a heat exchanger that receives hot/warm water therethrough (via inlet and outlet pipes 104, 105). Alternatively, the heater 130 may be a condenser of a refrigeration system to provide heat to the air that flows therepast through the housing 20. For the sake of brevity, the heater 130 as referenced herein includes within its scope a heat exchanger, a condenser from a refrigeration system, an electric/resistance heating element, or other structures that can provide heat to air that flows therepast-unless the disclosure herein specifically references one type of heating structure.

The housing 20 includes a passenger side portion 60 (or right side from the perspective of FIG. 1) and a driver side portion 160 (or left side from the perspective of FIG. 1). The passenger side portion 60 when assembled in the vehicle is closer to the right side of the vehicle (or passenger side for vehicles that are driven on the right side of the road) and the driver side portion 160 when assembled in the vehicle is closer to the left side of the vehicle (or driver side for vehicles that are driven on the right side of the road). In some embodiments, the passenger side 60 and the driver side 160 housings each receive air from the evaporator 120 and the heater 130, with the amount of air received from each flow path, discussed below, related to the position of the valves that are downstream of each of the bypass plenum (discussed below) and the heater 130.

Figure 5:
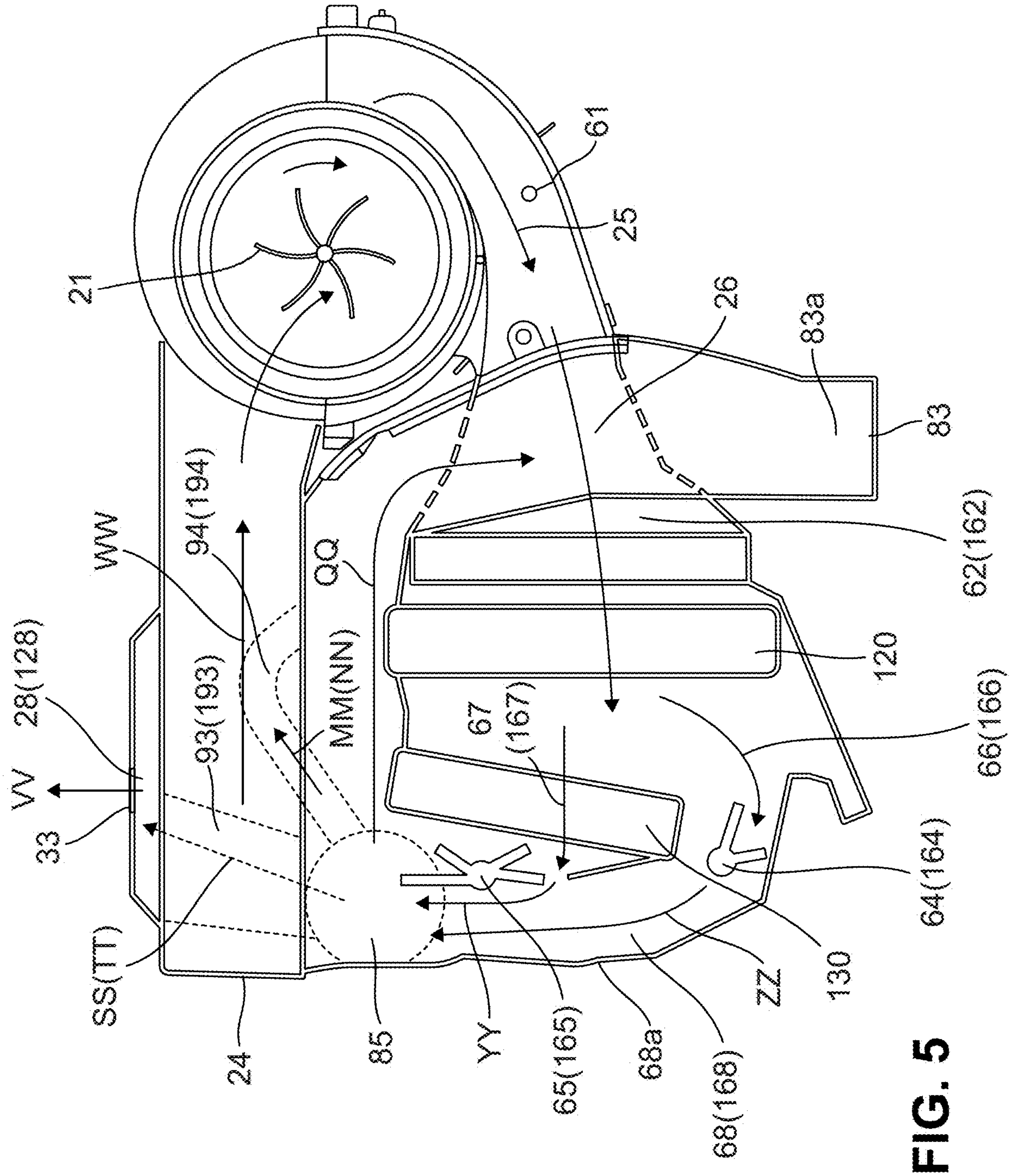
FIG. 5 is a schematic side cross-sectional view of the housing of FIG. 1 that depicts the right housing portion (60) and schematically depicts the various air flows within the housing and distribution plenums associated with the housing.
Figure 6:
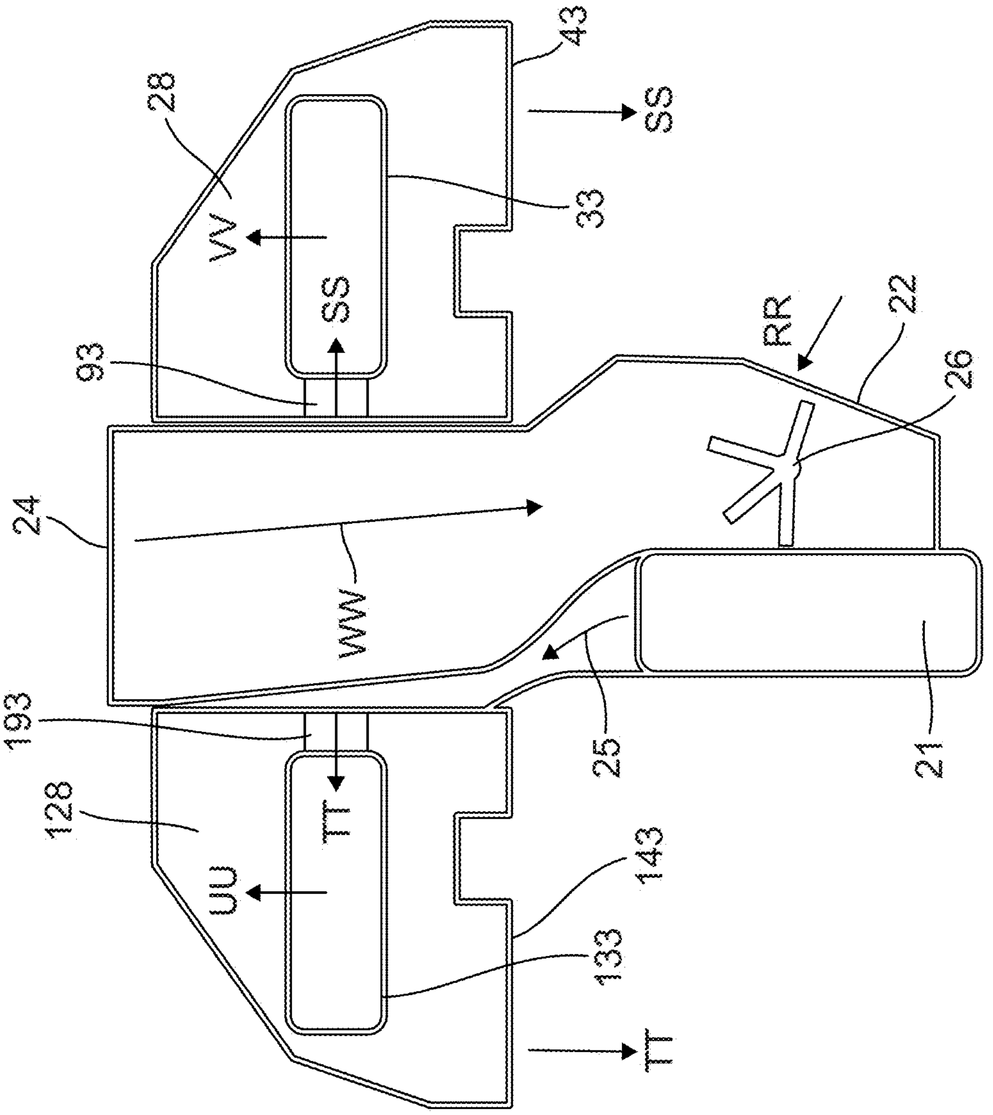
FIG. 6 is top schematic view of the housing of FIG. 1 that schematically depicts the various air flow within the housing and the distribution plenums associated with the housing.

FIG. 5 depicts the view the air flow path through one side of the housing 60 (right side or passenger side for a vehicle where the driver’s side is the left side of the vehicle—i.e. a vehicle configured to be driven on the right side of the road), and the flow through the opposite side 160 is the same but not depicted herein. The right and left side housings may be formed with the same structure and therefore a view of the left side housing would be the same as the view in FIG. 5 of the right side housing 60. FIG. 5 includes the structural elements within the right housing 60 and lists the corresponding element numbers that would exist in the left housing in parenthesis with respect to the identified elements in the right housing portion 60.

The housing 20 includes a first air flow path 25 from the discharge of the fan 21 that extends to the evaporator 120. Air leaving the evaporator either flows through the heater 130, or bypasses the heater 130 through a bypass plenum 66. Air that flows through the bypass plenum 66 flows through an outlet plenum 68 and ultimately to a mixing chamber 85. Air that flows through the heater 130 flows through a heater flow path 67 and into the outlet plenum 68 and into the mixing chamber 85. In some embodiments, the air flow path 25 from the fan 21 discharge and to the evaporator 120 may be a single plenum, and in some embodiments, the air may flow through single plenums either through the heater 130 or through the bypass plenum 66. In other embodiments, the first and second sides of the housing 60, 160 may have discrete flow paths for all or a portion of the flow path from the fan discharge to the heater or the bypass 68. In embodiments with discrete flow paths, both flow paths may flow through the same evaporator 120 and the same heater 130, or alternatively in other embodiments the discrete flow paths may flow through discrete evaporators 120 and heaters 130, which may be separately controlled by the controller 1000.

The bypass 68 flow path includes a door 64 that is movable between positions to isolate the bypass flow path (i.e. substantially prevent air to flow past the door at the outlet of the bypass flow path 68), or a fully open position to provide no (or very minimal) resistance to air to flow through the outlet of the bypass flow path 68, or a throttle position to allow only a portion of the nominal flow through the outlet of the bypass flow path 68. The heater flow path 67 includes a door 65 that is movable between positions to isolate the heater flow path (i.e. substantially prevent air to flow past the door 65 at the outlet of the heater 130), or a fully open position to provide no (or very minimal) resistance to the air to flow through the outlet of the heater flow path 65, and a throttle position to allow only a portion of the nominal flow through the outlet of the heater 130. The term substantially prevent is defined herein to mean that the overwhelming majority of possible flow is prevented from flowing past the door, but a minimal amount of flow may be allowed to flow therepast, such as for example due to minor gaps between an edge of the door and the housing that are present but not intended to be present to allow air therepast. The term "prevent" in the context of an allowance of the doors to air moving therepast when in a closed position (e.g. 64, 65) within the housing 20 means substantially prevent, as the doors within the housing 20 are not intended to form a closure that hermetically seals air flow therepast-unless specifically mentioned in this specification.

In some embodiments, the door 64 and the door 65 are operated in concert with each other, such that in an embodiment where the bypass door 64 is fully opened the heater door 65 is closed, in embodiments where the heater door is fully opened the bypass door 64 is fully shut, and in embodiments where the heater door 65 is throttled the bypass door 64 is also throttled. In this embodiment the doors 64, 65 have the opposite throttle positions, i.e. when the bypass door 64 is throttled to only slightly minimize the air flow through the bypass 66, the heater door is nearly fully closed to only allow a small amount of air from the heater 130 to pass therethrough and vice versa. In some embodiments, the doors 64 and 65 are separately operated by the controller 1000 and are maintained in their positions with separate signals from the controller 1000. In other embodiments, the doors 64 and 65 are constrained with each other such that when an operator 64*a*, which is mechanically connected to both of the doors 64, 65, moves the doors between positions (as directed by the controller 1000) the movement of the operator 64*a* results in the doors 64, 65 reaching various opposite positions based upon the position of the operator 64*a* (i.e. a first position of the operator the bypass door 64 is shut and the heater door is open, an opposite position of the operator 64*a* the heater door is shut and the bypass door 64 is open, and with various positions of the operator 64*a* the doors move between opposite throttle positions as discussed above).

As discussed above, the housing 20 includes a first side portion 60, and a second side portion 160 which are connected together to form the various plenums discussed herein. In one embodiment, the housing 20 includes two sets of doors, a first set of doors 64/65 associated with the respective bypass 66 and heater plenums 67 that are enclosed within enclosed volume formed within the first side of the housing 60, and a second set of doors 164/165 that are associated to control flow from the respective bypass 166 and heater plenums 167 within the enclosed volume formed within the second side 160 of the housing 20. The first set of doors 64/65 may be controlled by a single operator 64*a* (as discussed above and as depicted in FIGS. 1-4), while in other embodiments the first set of doors 64/65 may have their own dedicated operators as discussed above. The second set of doors 164/165 may be controlled by a single operator 164*a* (as depicted in FIGS. 1-4), while in other embodiments the second set of doors 164, 165 may have their own dedicated operators-similar to the discussion above with respect to the doors 64, 65.

In embodiments, there is a single air flow path 25 from the fan 21 discharge that leads to separate flow paths through the evaporator 120 (62, 162), separate bypasses (66, 166), and separate flow paths through heater 130 (67, 167) as discussed above. These separate flow paths lead to the dedicated valves 64/65, 164/165 as discussed above, which lead to separate outlet plenums 68/186 and to the separate mixing chambers 85/185.

In other embodiments, there is a single air flow path 25 within the housing 20 from the fan 21 discharge, a single flow path through the evaporator 120 (62), and single flow path past the heater 130 (67), and a single bypass 66, with the first and second sides 60, 160 supporting the separate valves 64/65, 164/165 downstream of the respective single bypass 66 and single heater flow path 67. The valves control air that flows into the separate outlet plenums 68/168 within the separate housing sides 60/160 that lead to the mixing chambers 85/185 within the separate housing sides 60/160.

The mixing chambers 85/185 receive air that flows from the bypass 66 (which may be a single bypass for both housing sides or separate bypasses for each housing side 60/160) and the heater flow path 67 (which may be a single heater flow path or separate heater flow paths for each housing side 60/160) and provides space for the two flows of air (when both are present depending upon the position of the valves 64/65, 164/165—or the only path when one of the two valves is shut) to at least partially mix (to allow for air tempering) within the housing 60 before leaving flowing to the distribution plenums as discussed herein. The bypass 66 (166) is arranged to direct the relatively cold air (that bypasses the heater) below the heater (as the assembly 10 is installed within the vehicle in the orientation as depicted the FIGS. 1-5 with the bottom of the page of each figure being down—i.e. toward the road that vehicle drives upon) and the top of each page being up (opposite of down) such that cold air flows below the heater. Due to the natural tendency of hotter air to rise, the position of the relative colder air minimizes the mixing of the colder air and the warmer air through the bypass 66, and the heater flow path 67, respectively. As depicted in FIG. 5, the bypass 66 is positioned such that air that flows therethrough, and past the valve 64 (164) flows through the outlet plenum 68 within the respective side 60/160 of the housing such that the colder air (arrows ZZ) flows proximate to the outer wall of the housing

68*a* that forms the outlet plenum. The relatively warmer air (arrows YY) that leaves the heater flow path 67 and flows through outlet plenum 68 (168) flows toward and into the mixing chambers 85/185 inside (with respect to the outer wall 60*a*/160*a*) of the colder air ZZ.

Some conventional HVAC housings for vehicles that include a heater flow path (with the same functionality as path 67) and a bypass heater flow path (with the same functionality as path 66), the outlets that allow selective air flow to the various locations with the vehicle (i.e. driver and passenger side vents, the defrost, rear row air flow, etc.). include isolation valves for those outlets that are just outside of the exits from the heater flow path and the bypass flow path (and the bypass and heater flow path isolation valves in those embodiments). In these embodiments, a baffle is typically provided facing the exit from the heater flow path 67 to disrupt and redirect the air that leaves the heater. In these embodiments, the baffle redirects the warm air away from the vent isolation valve to prevent air from flowing direction from the heater 130 and directly into the vent plenum (which directs air to the dashboard air vents proximate to the passenger or driver within the vehicle) when the vent isolation valve is fully open or partially throttled open, because it is typically not desired for warm air to flow out of the dashboard vents. The positioning of the housing sides 60/160 as disclosed above and depicted in FIG. 5 makes the baffle in the heater flow path 67 unnecessary. This is because the warm air from the heater flow path 67 flows first into the respective mixing chamber 85/185, where the air tempers with the cool air from the bypass 66 (if any) and then flows from the mixing chamber 85/185 and into the plurality of distribution panels.

In some embodiments the first and second mixing chambers 85, 185 are separated by a wall (not shown) that establishes a barrier between the first and second housing portions 60, 160. The barrier would be positioned between the two housing portions and would be parallel to the page that FIG. 5 is printed upon. In the view of FIG. 5, which specifically depicts the right (passenger) side housing portion 60, the wall would be between the sheet of paper that includes FIG. 5 and the view that looks at the section that includes the first housing 60. The barrier prevents mixing between the two mixing chambers 85, 185, and also may be configured to prevent mixing of air flowing through the first and second outlet plenums 68, 168. This separation may be helpful to allow for the air within the first mixing chamber 85 to be at a dramatically different temperature than the air within the second mixing chamber 185, to allow, for example, the air through the right and left vents 43, 143 to be at substantially different temperatures (such as if in the right chamber the bypass 66 was shut (valve 64 shut) and heater plenum 67 was open (valve 65 open) and in the left chamber the bypass 166 was open (valve 164 open) and the heater plenum 167 was blocked (valve 165 shut). In other embodiments, the housing 20 may not include any physical barrier between the volumes that establish the first and second mixing chambers 85, 185 and the first and second outlet plenums 68, 168. In these embodiments, the air that flows through the first and second outlet plenums 68, 168 does not tend to significantly mix, and the air within the first and second mixing chambers 85, 185 does not tend to significantly mix.

The housing 20 further comprises a plurality of distribution plenums that extend from the mixing chamber 85, and in embodiments with first and second housing sides 60/160 the specific distribution plenums extend from the right and left mixing chambers 85/185.

The distribution plenums may include first distribution plenum 93 that receives air from the right mixing chamber 85 and a second distribution plenum 193 that receives air from the left mixing chamber 185. The first and second distribution plenums 93, 193 direct air from the mixing chamber 85, 185 to the respective right and left vents 43, 143, as depicted schematically as air flows SS/TT. The right and left vents 43, 143 may be disposed within the dashboard (not shown) within a passenger compartment of a vehicle. The vents 43, 143 may include doors (not shown, but similar to door 64/164) that is controlled with operators 43*a*, 143*a* that allow the controller 1000 to cause the vents to selectively be opened, closed (to substantially prevent flow through past the door), or throttled partially open. Air flow from the mixing chamber 85/185 through the first and second distribution plenums 93/193 is depicted schematically as SS and TT. In some embodiments the doors (controlled by operators 43*a*, 143*a*) are positioned very proximate to the vents 43, 143 and significantly (as a proportion to the total length of the first and second distribution plenums 93, 193) from the respective first and second mixing chambers 85, 185.

Third and fourth distribution plenums 94/194 are further provided that lead to the respective right and left floor vents in the vehicle, that leads air into the floor by the passenger seat and the driver's seat respectively, with an air flow schematically depicted in FIG. 5 as MM and NN. The third and fourth distribution plenums 94/194 include doors (not shown, but similar to door 64) that are controlled by operators (not shown, but similar to the operators 43*a*, 143*a*, that are disposed proximate to floor vents that are operated by the controller to allow air through the floor vents, substantially prevent air through the floor vents, or throttle the air. In some embodiments the doors are positioned very proximate to the vents ends of the distribution plenums 94, 194 and significantly (as a proportion to the total length of the first and second distribution plenums 94, 194) from the respective first and second mixing chambers 85, 185.

The housing 20 further includes right and left wing portions 28, 128 that extend from the respective right and left portions 60, 160. The right wing portion 28 includes the first and third plenums 93, 94, and the left wing portion includes the second and fourth plenums 193, 194

The right and left wing portions further may include defrost plenums 33, 133 that allow flow of air from the respective mixing chamber 85, 185 and into the defrost plenum (depicted schematically as UU, VV). The defrost plenums 33, 133 may include doors (not shown but similar to doors 64, with operators not shown but similar to operators 43*a*, 143*a*) that are operated by the controller 1000 to allow air to flow through the respective defrost plenum 33, 133 or to substantially prevent air from flowing through the defrost plenum 33, 133. In some embodiments the doors are positioned very proximate to the defrost outlets 33, 133 and significantly (as a proportion to the total length of the defrost plenums) from the respective first and second mixing chambers 85, 185. When the controller operates the defrost mode, the controller has doors 64/164 fully closed and the doors 65, 165 fully open to allow only warm air that passes the heater 130 to flow into the mixing chambers 185 and into the defrost plenums 33, 133.

The housing may include a fifth distribution plenum 83 that pulls air from one or both of the first and second mixing chambers 85/185 as shown schematically as flow QQ. The air that flows through the fifth distribution plenum 83 flows to a second row seating space within the vehicle or a rear portion of the vehicle. FIG. 5 depicts a pivot point 83*a* upon which a door (not shown, but similar to doors 64/164 and controlled by an operator similar to operators 43*a*/143*a*) that can selectively fully allow air flow, substantially prevent air flow, or throttle air flow depending upon the HVAC settings for climate control in the second row or rear portion of the vehicle. In some embodiments the door is positioned very proximate to the fifth distribution end and significantly (as a proportion to the total length of the fifth distribution plenum 83) from the one or both of the first and second mixing chambers 85, 185 from which the fifth distribution plenum 83 receives air. In some embodiment, the door may be positioned outside of the housing 20 depicted in the figures and positioned within a vehicle plenum proximate to the second row (or rear portion of the vehicle) where the air enters into the passenger compartment.

In the embodiments depicted in FIGS. 1-6, there are no doors between the mixing chambers 85, 185 and the entry into the various first through fifth distribution plenums. This embodiment allows the air to flow freely at all times and minimizes the design complexity of the housing 20, due to the elimination of a need to provide isolation doors at the entrances to the plenums (as with typical housings in the prior art that have similar functionality to the assembly 10).

The term "about" is specifically defined herein to include a range that includes the reference value and plus or minus 5% of the reference value. The term "substantially the same" is when the item under comparison is within 5% of the aspect of the reference value of the item.

The computing elements or functions disclosed herein including the controller 1000 may include a processor and a memory storing computer-readable instructions executable by the processor. In some embodiments, the processor is a hardware processor configured to perform a predefined set of basic operations in response to receiving a corresponding basic instruction selected from a predefined native instruction set of codes. Each of the modules defined herein may include a corresponding set of machine codes selected from the native instruction set, and which may be stored in the memory. Embodiments can be implemented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, optical disc, memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described embodiments can also be stored on the machine-readable medium. Software running from the machine-readable medium can interface with circuitry to perform the described tasks. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Naturally, in view of the teachings and disclosures herein, persons having ordinary skill in the art may appreciate that alternate designs and/or embodiments of the invention may be possible (e.g., with substitution of one or more components for others, with alternate configurations of components, etc.). Although some of the components, relations, configurations, and/or steps according to the invention are not specifically referenced and/or depicted in association with one another, they may be used, and/or adapted for use, in association therewith. All of the aforementioned and various other structures, configurations, relationships, utilities, any which may be depicted and/or based hereon, and the like may be, but are not necessarily, incorporated into and/or achieved by the invention. Any one or more of the aforementioned and/or depicted structures, configurations, relationships, utilities and the like may be implemented in and/or by the invention, on their own, and/or without reference, regard or likewise implementation of any of the other aforementioned structures, configurations, relationships, utilities and the like, in various permutations and combinations, as will be readily apparent to those skilled in the art, without departing from the pith, marrow, and spirit of the disclosed invention While the preferred embodiments of the disclosed have been described, it should be understood that the invention is not so limited and modifications may be made without departing from the disclosure. The scope of the disclosure is defined by the appended claims, and all devices that come within the meaning of the claims, either literally or by equivalence, are intended to be embraced therein.

The specification can be readily understood with reference to the following Numbered Paragraphs:

Numbered Paragraph 1: An assembly for air movement within a vehicle, comprising:

a housing, the housing establishes an air inlet and one or more air outlets, the housing includes a fan disposed proximate to the air inlet wherein operation of the fan urges air to flow into the air inlet, the housing further comprises an evaporator disposed such that air leaving the discharge of the fan flows through the evaporator, and a heater, the housing further comprises a mixing chamber that is downstream of the evaporator and the heater, the housing defines a plurality of internal air flow plenums downstream of the evaporator, comprising a first air flow plenum that extends through and past the heater and into the mixing chamber, and a second air flow plenum that bypasses the heater and flows into the mixing chamber;

the mixing chamber receives air from the first and second air flow plenums, wherein air from the first and second flow plenums interacts therein;

the housing further comprises a plurality of distribution plenums that extend from the mixing chamber, wherein each of the plurality of distribution plenums includes a flow valve therein and proximate to an exit of the respective distribution chamber, wherein the flow valve for each of the plurality of distribution chambers is configured to allow or substantially prevent air flow to exit the respective distribution plenum.

Numbered Paragraph 2: The assembly of Numbered Paragraph 1:

1, wherein the housing is adapted to be installed within a vehicle, wherein when installed, the air inlet pulls air from within a passenger compartment of the vehicle, and the one or more air outlets direct air from the housing to respective one or more locations within the passenger compartment of the vehicle.

Numbered Paragraph 3: The assembly of either one of Numbered Paragraphs 1 or 2, wherein the housing does not include a baffle that interacts with air that leaves the heater via the first air flow plenum as the air flows toward the mixing chamber.

Numbered Paragraph 4: The assembly of Numbered Paragraph 3, wherein air that travels through each of the first and second air flow plenums travels through the mixing chamber before flowing into each of the plurality of distribution plenums.

Numbered Paragraph 5: The assembly of any one of the preceding Numbered Paragraphs, wherein there are no doors between the mixing chamber and the plurality of distribution plenums.

Numbered Paragraph 6: The assembly of any one of the preceding Numbered Paragraphs, wherein the first air flow plenum comprises a first door at an outlet thereof, wherein the first door is positionable to an open position allow air flow therepast and into the mixing chamber, and to a throttle position to throttle the amount of air flow therepast, and to a closed position to substantially prevent air flow therepast.

Numbered Paragraph 7: The assembly of Numbered Paragraph 6, wherein the second air flow plenum comprises a second door at an outlet thereof, wherein the second door is positionable to an open position to allow air flow therepast and into the mixing chamber, and to a throttle position to throttle the amount of air flow therepast, and to a closed position to substantially prevent air flow therepast.

Numbered Paragraph 8: The assembly of Numbered Paragraph 7, wherein the first and second doors are arranged such that when the first door is in the open position, the second door is in the closed position, and when the first door is in the closed position, the second door is in the open position.

Numbered Paragraph 9: The assembly of any one of the preceding Numbered Paragraphs, wherein the plurality of distribution plenums comprise a first plenum that directs air toward a driver side portion of a vehicle that includes the assembly for air movement, a second plenum that directs air toward a front row passenger side portion of the vehicle, and a third portion that directs air toward a rear portion of the vehicle.

Numbered Paragraph 10: The assembly of any one of the preceding Numbered Paragraphs, wherein the housing comprises a second air inlet that receives air that flows into the second air inlet from outside of a passenger compartment of the vehicle.

Numbered Paragraph 11: The assembly of any one of the preceding Numbered Paragraphs, wherein the housing comprises a left housing assembly and a right housing assembly, wherein the first air flow plenum comprises a first left air flow plenum within the left housing assembly and a first right air flow plenum within the right housing assembly,

- wherein the second air flow plenum comprises a second left air flow plenum within the left housing assembly and a second right air flow plenum within the left housing assembly, and
- wherein each of the left and right housing assemblies comprise their own mixing chamber,
- wherein a first of the plurality of distribution plenums extends from the mixing chamber in the left housing, and a second of the plurality of distribution plenums extends from the mixing chamber in the right housing.

Numbered Paragraph 12: The assembly of Numbered Paragraph 11, wherein a third of the plurality of distribution plenums receives air from one or both of the mixing chambers from the right and left housing assemblies.

Numbered Paragraph 13: The assembly of Numbered Paragraph 11, wherein the left housing assembly does not include a baffle that interacts with air that leaves the heater via the first left air flow plenum as air flows toward the mixing chamber within the left housing assembly, and the right housing assembly does not include a baffle that interacts with air that leaves the heater via the first right air flow plenum and flows to toward the mixing chamber within the right housing assembly.

Numbered Paragraph 14: The assembly of any one of Numbered Paragraphs 1-10, wherein the housing comprises a left housing assembly and a right housing assembly, wherein the first air flow plenum directs a portion of the air flowing therethrough into the left housing assembly and a remaining portion of the air flowing therethrough into the right housing assembly, and

- wherein the second air flow plenum directs a portion of the air flowing therethrough into the left housing assembly and a remaining portion of the air flowing therethrough into the right housing assembly;
- wherein each of the left and right housing assemblies comprise their own mixing chamber,
- wherein a first of the plurality of distribution plenums extends from the mixing chamber in the left housing, and a second of the plurality of distribution plenums extends from the mixing chamber in the right housing.

Numbered Paragraph 15: The assembly of Numbered Paragraph 14, wherein a third of the plurality of distribution plenums receives air from one or both of the mixing chambers from the right and left housing assemblies.

Numbered Paragraph 16: The assembly of Numbered Paragraph 14, wherein the left housing assembly does not include a baffle that interacts with air that leaves the heater via the first air flow plenum as the air enters into the left housing assembly and flows toward the mixing chamber within the left housing assembly, and the right housing assembly does not include a baffle that interacts with air that leaves the heater via the first air flow plenum as the air enters into the right housing assembly and flows to toward the mixing chamber within the right housing assembly.

Numbered Paragraph 17: A method of operating an assembly of any one of Numbered Paragraphs 1-16 when installed within a vehicle, comprising the steps of identifying a desired air temperature within one or more compartment spaced within the vehicle and causing the assembly to operate the structures within the housing to provide air in one more locations at the desired temperature.

The invention claimed is:

1. An assembly for air movement within a vehicle, comprising:

- a housing, the housing establishes an air inlet and one or more air outlets, the housing includes a fan disposed proximate to the air inlet wherein operation of the fan urges air to flow into the air inlet, the housing further comprises an evaporator disposed such that air leaving the discharge of the fan flows through the evaporator, and a heater, the housing further comprises a mixing chamber that is downstream of the evaporator and the heater,
- the housing defines a plurality of internal air flow plenums downstream of the evaporator, comprising a first air flow plenum that extends through and past the heater and into the mixing chamber, and a second air flow plenum that bypasses the heater and flows into the mixing chamber;
- the mixing chamber receives air from the first and second air flow plenums, wherein air from the first and second flow plenums interacts therein;

the housing further comprises a plurality of distribution plenums that extend from the mixing chamber, wherein each of the plurality of distribution plenums includes a flow valve therein and proximate to an exit of the respective first or second distribution plenum, wherein the flow valve for each of the plurality of distribution plenums is configured to allow or substantially prevent air flow to exit the respective distribution plenum, wherein the housing does not include a baffle that interacts with air that leaves the heater via the first air flow plenum as the air flows toward the mixing chamber, and wherein the second air flow plenum is arranged below the heater and toward a ground which the vehicle travels on.

2. The assembly of claim 1, wherein the housing is adapted to be installed within a vehicle, wherein when installed, the air inlet pulls air from within a passenger compartment of the vehicle, and the one or more air outlets direct air from the housing to respective one or more locations within the passenger compartment of the vehicle.

3. The assembly of claim 1, wherein air that travels through each of the first and second air flow plenums travels through the mixing chamber before flowing into each of the plurality of distribution plenums.

4. The assembly of claim 1, wherein there are no doors between the mixing chamber and the plurality of distribution plenums.

5. The assembly of claim 1, wherein the first air flow plenum comprises a first door at an outlet thereof, wherein the first door is positionable to an open position allow air flow therepast and into the mixing chamber, and to a throttle position to throttle the amount of air flow therepast, and to a closed position to substantially prevent air flow therepast.

6. The assembly of claim 5, wherein the second air flow plenum comprises a second door at an outlet thereof, wherein the second door is positionable to an open position to allow air flow therepast and into the mixing chamber, and to a throttle position to throttle the amount of air flow therepast, and to a closed position to substantially prevent air flow therepast.

7. The assembly of claim 6, wherein the first and second doors are arranged such that when the first door is in the open position, the second door is in the closed position, and when the first door is in the closed position, the second door is in the open position.

8. The assembly of claim 1, wherein the plurality of distribution plenums comprise a first plenum that directs air toward a driver side portion of a vehicle that includes the assembly for air movement, a second plenum that directs air toward a front row passenger side portion of the vehicle, and a third portion that directs air toward a rear portion of the vehicle.

9. The assembly of claim 1, wherein the housing comprises a second air inlet that receives air that flows into the second air inlet from outside of a passenger compartment of the vehicle.

10. The assembly of claim 1, wherein the housing comprises a left housing assembly and a right housing assembly, wherein the first air flow plenum comprises a first left air flow plenum within the left housing assembly and a first right air flow plenum within the right housing assembly, wherein the second air flow plenum comprises a second left air flow plenum within the left housing assembly and a second right air flow plenum within the left housing assembly, and wherein each of the left and right housing assemblies comprise their own mixing chamber, wherein a first of the plurality of distribution plenums extends from the mixing chamber in the left housing, and a second of the plurality of distribution plenums extends from the mixing chamber in the right housing.

11. The assembly of claim 10, wherein a third of the plurality of distribution plenums receives air from one or both of the mixing chambers from the right and left housing assemblies.

12. The assembly of claim 10, wherein the left housing assembly does not include a baffle that interacts with air that leaves the heater via the first left air flow plenum as air flows toward the mixing chamber within the left housing assembly, and the right housing assembly does not include a baffle that interacts with air that leaves the heater via the first right air flow plenum and flows to toward the mixing chamber within the right housing assembly.

13. The assembly of claim 1, wherein the housing comprises a left housing assembly and a right housing assembly, wherein the first air flow plenum directs a portion of the air flowing therethrough into the left housing assembly and a remaining portion of the air flowing therethrough into the right housing assembly, and wherein the second air flow plenum directs a portion of the air flowing therethrough into the left housing assembly and a remaining portion of the air flowing therethrough into the right housing assembly;

wherein each of the left and right housing assemblies comprise their own mixing chamber, wherein a first of the plurality of distribution plenums extends from the mixing chamber in the left housing, and a second of the plurality of distribution plenums extends from the mixing chamber in the right housing.

14. The assembly of claim 13, wherein a third of the plurality of distribution plenums receives air from one or both of the mixing chambers from the right and left housing assemblies.

15. The assembly of claim 13, wherein the left housing assembly does not include a baffle that interacts with air that leaves the heater via the first air flow plenum as the air enters into the left housing assembly and flows toward the mixing chamber within the left housing assembly, and the right housing assembly does not include a baffle that interacts with air that leaves the heater via the first air flow plenum as the air enters into the right housing assembly and flows to toward the mixing chamber within the right housing assembly.

* * * * *